United States Patent
Hayama et al.

(10) Patent No.: US 11,841,090 B2
(45) Date of Patent: Dec. 12, 2023

(54) CAPACITY CONTROL VALVE (71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 65 days.

(21) Appl. No.: 17/599,539

(22) PCT Filed: Apr. 2, 2020

(86) PCT No.: PCT/JP2020/015175
§ 371 (c)(1),
(2) Date: Sep. 28, 2021

(87) PCT Pub. No.: WO2020/204131
PCT Pub. Date: Oct. 8, 2020

(65) Prior Publication Data
US 2022/0196168 A1  Jun. 23, 2022

(30) Foreign Application Priority Data
Apr. 3, 2019 (JP) ................................. 2019-071630

(51) Int. Cl.
*F04B 27/00* (2006.01)
*F16K 31/06* (2006.01)
*F04B 27/16* (2006.01)

(52) U.S. Cl.
CPC .......... *F16K 31/0613* (2013.01); *F04B 27/16* (2013.01)

(58) Field of Classification Search
CPC .. F16K 11/10; F16K 11/0716; F16K 31/0163; F04B 27/0895; F04B 27/1009;
(Continued)

(56) References Cited

U.S. PATENT DOCUMENTS 6,010,312 A    1/2000  Suitou et al. .............. F04B 1/26
6,354,811 B1   3/2002  Ota et al. .................... 417/222.2
(Continued)

FOREIGN PATENT DOCUMENTS

EP    1081378    3/2001    .............. F04B 27/18
EP    2594794    5/2013    .............. F04B 27/18
(Continued)

OTHER PUBLICATIONS

Chinese Official Action issued in related application serial No. 201980044409.4, dated Jan. 26, 2022, with translation, 10 pages.
(Continued)

*Primary Examiner* — Kelsey E Cary
(74) *Attorney, Agent, or Firm* — HAYES SOLOWAY P.C.

(57) ABSTRACT

A capacity control valve includes a valve housing; a rod configured to be driven by a solenoid; a CS valve formed by a CS valve seat and a CS valve element configured to open and close a communication between the control port and the suction port; a DC valve formed by a DC valve seat and a DC valve element arranged movably with respect to the CS valve element, the DC valve being configured to open and close a communication between the discharge port and the control port in accordance with movement of the rod; and a pressure drive portion coupled to the CS valve element to be movable in an integrated manner with the CS valve element and arranged in a suction fluid supply chamber formed in the valve housing and to which the suction fluid is supplied, the pressure drive portion being driven by the suction pressure.

6 Claims, 8 Drawing Sheets

(58) Field of Classification Search
CPC ...... F04B 27/16; F04B 27/18; F04B 27/1804;
F04B 49/22; F04B 2201/06; F04B
2027/1822; F04B 2027/1813; F04B
2027/1881; F04B 2027/1877; F04B
2027/1868; F04B 2027/1859; F04B
2027/1854; F04B 2027/1845; F04B
2027/1831; F04B 2027/1827

See application file for complete search history.

(56) References Cited

U.S. PATENT DOCUMENTS

| | | | |
|---|---|---|---|
| 6,358,017 | B1 | 3/2002 | Ota et al. ............... 417/222.2 |
| 6,361,283 | B1 | 3/2002 | Ota et al. ............... 417/222.2 |
| 6,485,267 | B1 | 11/2002 | Imai et al. ............. F04B 1/26 |
| 8,021,124 | B2 | 9/2011 | Umemura et al. ........ 417/222.2 |
| 8,079,827 | B2 | 12/2011 | Iwa et al. ............... 417/222.2 |
| 9,732,874 | B2 | 8/2017 | Saeki ............ F04B 27/1804 |
| 9,777,863 | B2 | 10/2017 | Higashidozono ... F04B 27/1804 |
| 10,781,804 | B2 | 9/2020 | Higashidozono et al. ........... F04B 27/18 |
| 11,053,933 | B2 | 7/2021 | Warren ........... F04B 27/1804 |
| 11,085,431 | B2 | 8/2021 | Fukudome ......... F04B 27/18 |
| 11,156,301 | B2 | 11/2021 | Hayama ........... F16K 31/0627 |
| 11,326,585 | B2 | 5/2022 | Hayama et al. .... F04B 27/1009 |
| 11,359,624 | B2 | 6/2022 | Kurihara et al. ....... F04B 49/12 |
| 2004/0060604 | A1 | 4/2004 | Uemura et al. ............. 137/595 |
| 2005/0035321 | A1 | 2/2005 | Uemura ............... F16K 27/041 |
| 2005/0287014 | A1 | 12/2005 | Umemura ........... F04B 27/1804 |
| 2006/0218953 | A1 | 10/2006 | Hirota ..................... 62/228.5 |
| 2007/0214814 | A1 | 9/2007 | Umemura et al. ........... 62/228.1 |
| 2008/0138213 | A1 | 6/2008 | Umemura .......... F04B 27/1804 |
| 2009/0108221 | A1 | 4/2009 | Umemura .......... F04B 27/1804 |
| 2009/0183786 | A1 | 7/2009 | Iwa et al. .................. 137/487.5 |
| 2012/0198992 | A1 | 8/2012 | Futakuchi et al. ............. 91/505 |
| 2012/0198993 | A1 | 8/2012 | Fukudome et al. .... F04B 27/18 |
| 2013/0126017 | A1 | 5/2013 | Ota et al. ........... F04B 27/1804 |
| 2014/0130916 | A1 | 5/2014 | Saeki ................. F04B 27/1804 |
| 2015/0004010 | A1 | 1/2015 | Saeki ................. F04B 27/1804 |
| 2015/0010410 | A1 | 1/2015 | Saeki et al. |
| 2015/0068628 | A1 | 3/2015 | Iwa et al. ............... F16K 31/06 |
| 2015/0211506 | A1 | 7/2015 | Shirafuji et al. .... F04B 27/1804 |
| 2015/0345655 | A1 | 12/2015 | Higashidozono et al. ........... F16K 31/0624 |
| 2016/0290326 | A1* | 10/2016 | Sugamura ........... F04B 27/1804 |
| 2017/0175726 | A1 | 6/2017 | Kume ................. F04B 27/1804 |
| 2017/0028462 | A1 | 10/2017 | Hayama et al. ........ F16K 47/06 |
| 2017/0284562 | A1 | 10/2017 | Hayama et al. ........ F16K 47/06 |
| 2017/0356430 | A1 | 12/2017 | Irie et al. ............. F04B 27/1804 |
| 2018/0291888 | A1 | 10/2018 | Tonegawa ........... F16K 31/0604 |
| 2020/0362974 | A1 | 11/2020 | Hayama ................. F04B 49/22 |
| 2021/0285433 | A1 | 9/2021 | Hayama ............. F04B 27/1804 |
| 2022/0034414 | A1 | 2/2022 | Ito ........................... F04B 27/18 |

FOREIGN PATENT DOCUMENTS

| | | | |
|---|---|---|---|
| EP | 2784320 | 10/2014 | ............. F04B 27/18 |
| EP | 3431760 | 1/2019 | ............. F04B 27/18 |
| JP | 5-306679 | 11/1993 | ............. F04B 27/08 |
| JP | 6-200875 | 7/1994 | ............. F04B 27/08 |
| JP | 7-27049 | 1/1995 | ............. F04B 27/10 |
| JP | 9-144929 | 6/1997 | ............. F16K 31/06 |
| JP | 10-148258 | 6/1998 | ............... F16J 3/04 |
| JP | 2000-345961 | 12/2000 | ............. F04B 27/14 |
| JP | 2001-73939 | 3/2001 | ............. F04B 27/14 |
| JP | 2001-132632 | 5/2001 | ............. F04B 27/14 |
| JP | 2003-42062 | 2/2003 | ............. F04B 27/14 |
| JP | 2006-52648 | 2/2006 | ............. F04B 27/14 |
| JP | 2006-307828 | 11/2006 | ............. F04B 27/14 |
| JP | 2007-247512 | 9/2007 | ............. F04B 27/14 |
| JP | 2008-14269 | 1/2008 | ............. F04B 27/14 |
| JP | 2008-202572 | 9/2008 | ............. F04B 27/14 |
| JP | 4242624 | 1/2009 | ............. F04B 49/00 |
| JP | 2011-32916 | 2/2011 | ............. F04B 27/14 |
| JP | 4700048 | 3/2011 | ............. F04B 49/00 |
| JP | 5167121 | 12/2012 | ............. F04B 27/14 |
| JP | 2014-118939 | 6/2014 | ............. F04B 27/14 |
| JP | 5557901 | 6/2014 | ............. F04B 27/14 |
| JP | 2014-190247 | 10/2014 | ............. F04B 27/14 |
| JP | 2016-196876 | 11/2016 | ............. F04B 27/18 |
| JP | 2017-129042 | 7/2017 | ............. F04B 27/18 |
| JP | 6206274 | 10/2017 | ............. F04B 27/18 |
| JP | 2017-223348 | 12/2017 | ............. F16K 11/10 |
| JP | 2018-21646 | 2/2018 | ............. F16K 31/06 |
| JP | 2018-40385 | 3/2018 | ............. F16K 31/06 |
| JP | 2018-145877 | 9/2018 | ............. F04B 39/14 |
| JP | 2019-2384 | 1/2019 | ............. F04B 27/18 |
| WO | WO2007119380 | 10/2007 | ............. F04B 27/14 |
| WO | WO2011021789 | 2/2011 | ............. F04B 27/14 |
| WO | WO2011135911 | 11/2011 | ............. F04B 27/14 |
| WO | WO2013109005 | 7/2013 | ............. F04B 49/06 |
| WO | WO2013176012 | 11/2013 | ............. F04B 27/14 |
| WO | WO2014091975 | 6/2014 | ............. F04B 27/14 |
| WO | WO2014119594 | 8/2014 | ............. F04B 27/14 |
| WO | WO2016104390 | 6/2016 | ............. F16K 31/06 |
| WO | WO2017057160 | 4/2017 | ............. F04B 27/18 |
| WO | WO2017159553 | 9/2017 | ............. F04B 27/18 |
| WO | WO2018207461 | 11/2018 | ............. F04B 27/18 |
| WO | WO2019167912 | 9/2019 | ............. F04B 27/18 |

OTHER PUBLICATIONS

Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1. dated Feb. 9, 2022, 5 pages.
European Search Report issued in related application serial No. 19834556.3, dated Feb. 17, 2022, 7 pages.
European Search Report issued in related application serial No. 19833028.4. dated Apr. 7, 2022, 8 pages.
European Search Report issued in related application serial No. 19894059.5, dated Jun. 7, 2022, 4 pages.
European Search Report issued in related application serial No. 19883193.5. dated May 23, 2022, 5 pages.
US Official Action issued in related U.S. Appl. No. 17/299,285, dated Mar. 31, 2022, 11 pages.
US Official Action issued in related U.S. Appl. No. 17/256,953, dated Apr. 15, 2022, 18 pages.
US Official Action issued in related U.S. Appl. No. 17/259,138, dated Mar. 31, 2022, S pages.
US Official Action issued in related U.S. Appl. No. 17/256,955, dated Feb. 18, 2022, 19 pages.
US Official Action issued in related U.S. Appl. No. 17/259,138, dated Jan. 19, 2022, 6 pages.
US Official Action issued in related U.S. Appl. No. 17/256,959, dated May 5, 2022, 18 pages.
US Official Action issued in related U.S. Appl. No. 17/433,558, dated May 25, 2022, 11 pages.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.

(56) References Cited

OTHER PUBLICATIONS

International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
US Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
Chinese Official Action issued in related application serial No. 202080016397.7, dated Aug. 3, 2022, with translation, 10 pages.
Chinese Official Action issued in related application serial No. 202080007416.X, dated Jul. 28, 2022, with translation, 9 pages.
European Official Action issued in related application serial No. 20782597.7, dated Oct. 19, 2022, 5 pages.
US Official Action issued in related U.S. Appl. No. 17/256,955, dated Aug. 23, 2022, 17 pages.
US Notice of Allowance issued in related U.S. Appl. No. 17/256,959, dated Sep. 7, 2022, 13 pages.
www.lexico.com/en/definition/connected accessed Aug. 15, 2022, Year 2022.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
International Search Report and Written Opinion issued in PCT/JP2021/015598, dated Jun. 15, 2021, with English translation, 13 pages.
International Preliminary Report on Patentability issued in PCT/JP2020/015598, dated Oct. 25, 2022, 5 pages.
Chinese Official Action issued in related application serial No. 202080026878.6, dated Oct. 9, 2022, with translation, 9 pages.
Chinese Official Action issued in related application serial No. 201980046750.3, dated Nov. 3, 2022, with translation, 11 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and the control pressure Pc of the control chamber of the variable displacement compressor is adjusted.

At the time of normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a desired cooling ability. In a case where the variable displacement compressor is driven at the maximum capacity, by controlling the capacity control valve and decreasing the pressure of the control chamber of the variable displacement compressor, the tilt angle of the swash plate is maximized.

There is also a known capacity control valve in which an auxiliary communication passage providing communication between a control port and a suction port of the capacity control valve is formed, and at the time of start-up, a coolant of a control chamber of a variable displacement compressor is discharged to a suction chamber of the variable displacement compressor through the control port, the auxiliary communication passage, and the suction port, so that pressure of the control chamber is promptly lowered at the time of start-up to improve responsiveness of the variable displacement compressor (see Patent Citation 1).

CITATION LIST

Patent Literature

Patent Citation 1: JP 5167121 B2 (PAGE 7, FIG. 2)

SUMMARY OF INVENTION

Technical Problem

However, in Patent Citation 1, although a fluid discharge function at the time of start-up is excellent, the auxiliary communication passage always communicates. Thus, since the coolant flows from the control port into the suction port via the auxiliary communication passage at the time of continuously driving the variable displacement compressor, there is a possibility that compression efficiency is deteriorated.

The present invention is achieved focusing on such a problem, and an object thereof is to provide a capacity control valve with which a fluid discharge function at the time of start-up is excellent and compression efficiency is high.

Solution to Problem

In order to solve the foregoing problem, a capacity control valve according to the present invention includes a valve housing provided with a discharge port through which a discharge fluid of discharge pressure passes, a suction port through which a suction fluid of suction pressure passes, and a control port through which a control fluid of control pressure passes; a rod configured to be driven by a solenoid; a CS valve formed by a CS valve seat and a CS valve element and configured to open and close a communication between the control port and the suction port; a DC valve formed by a DC valve seat and a DC valve element and arranged movably with respect to the CS valve element, the DC valve being configured to open and close a communication between the discharge port and the control port in accordance with a movement of the rod; and a pressure drive portion coupled to the CS valve element to be movable in an integrated manner with the CS valve element and arranged in a suction fluid supply chamber which is formed in the valve housing and to which the suction fluid is supplied, the pressure drive portion being driven by the suction pressure. The CS valve element and DC valve element are moved together by the movement of the rod while maintaining a closed state of the CS valve. When the rod is further moved, the CS valve element is moved alone and the DC valve element is left while maintaining a closed state of the DC valve. According to the aforesaid feature of the present invention, by arranging the DC valve element movably with respect to the CS valve element, it is possible to perform open/close control of the DC valve in a state where the CS valve is closed at the time of normal control. Moreover, by opening the CS valve and providing communication between the control port and the suction port by the movement of the rod while maintaining a closed state of the DC valve in the maximum energized state, it is possible to lower the control pressure. Thus, it is possible to provide the capacity control valve with which a fluid discharge function at the time of start-up is excellent and compression efficiency is high. In addition, at the time of start-up, normal control, etc., when the suction pressure in the suction fluid supply chamber is high, it is possible to operate the pressure drive portion to supplement drive force of the solenoid. Thus, it is possible to provide the capacity control valve having a stable fluid discharge function and a stable compression performance at the time of start-up.

It may be preferable that, the DC valve element is externally fitted to the CS valve element, and the CS valve seat may be formed in an inner diameter portion of the DC valve element. According to this preferable configuration, by inserting the CS valve element into the DC valve element, it is possible to form a compact capacity control valve having the DC valve, and to move the DC valve element and the CS valve element together while reliably maintaining a closed state of the CS valve in a non-energized state and at the time of normal control.

It may be preferable that, the CS valve seat is formed in one end of the DC valve element, and the DC valve seat is formed on a radially outer side of the CS valve seat. According to this preferable configuration, by forming the CS valve seat in the inner diameter portion at one end of the DC valve element and forming the DC valve seat on the radially outer side of the CS valve seat, a flow passage is smoothly switched by opening and closing the CS valve and the DC valve. Thus, responsiveness is good.

It may be preferable that the DC valve element is biased in a valve closing direction of the DC valve by bias means. According to this preferable configuration, in a non-energized state and at the time of normal control, the DC valve element can reliably maintain a closed state with respect to the CS valve element, and in the maximum energized state, the DC valve element can reliably maintain a closed state with respect to the DC valve seat. In addition, in a non-energized state and at the time of normal control, the DC valve element is biased in the direction in which the rod is moved by the bias means. Thus, it is possible to reduce an electric current applied to the solenoid.

It may be preferable that a communication portion communicating with the suction fluid supply chamber is formed in the CS valve element. According to this preferable configuration, it is possible to simplify a structure of the valve housing.

It may be preferable that a second suction port is formed in the valve housing at a position where the pressure drive portion is not arranged. According to this preferable configuration, it is possible to simplify a structure of the CS valve element.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 7. Hereinafter, description will be given with the left and right sides seen from the front side of FIG. 2 being the left and right sides of the capacity control valve.

A capacity control valve V according to the first embodiment of the present invention is assembled into a variable displacement compressor M used for an air conditioning system of an automobile, etc. By variably controlling pressure of a working fluid (hereinafter, simply referred to as the "fluid") serving as a coolant, a discharge amount of the variable displacement compressor M is controlled and the air conditioning system is adjusted to have a desired cooling ability.

Figure 1:
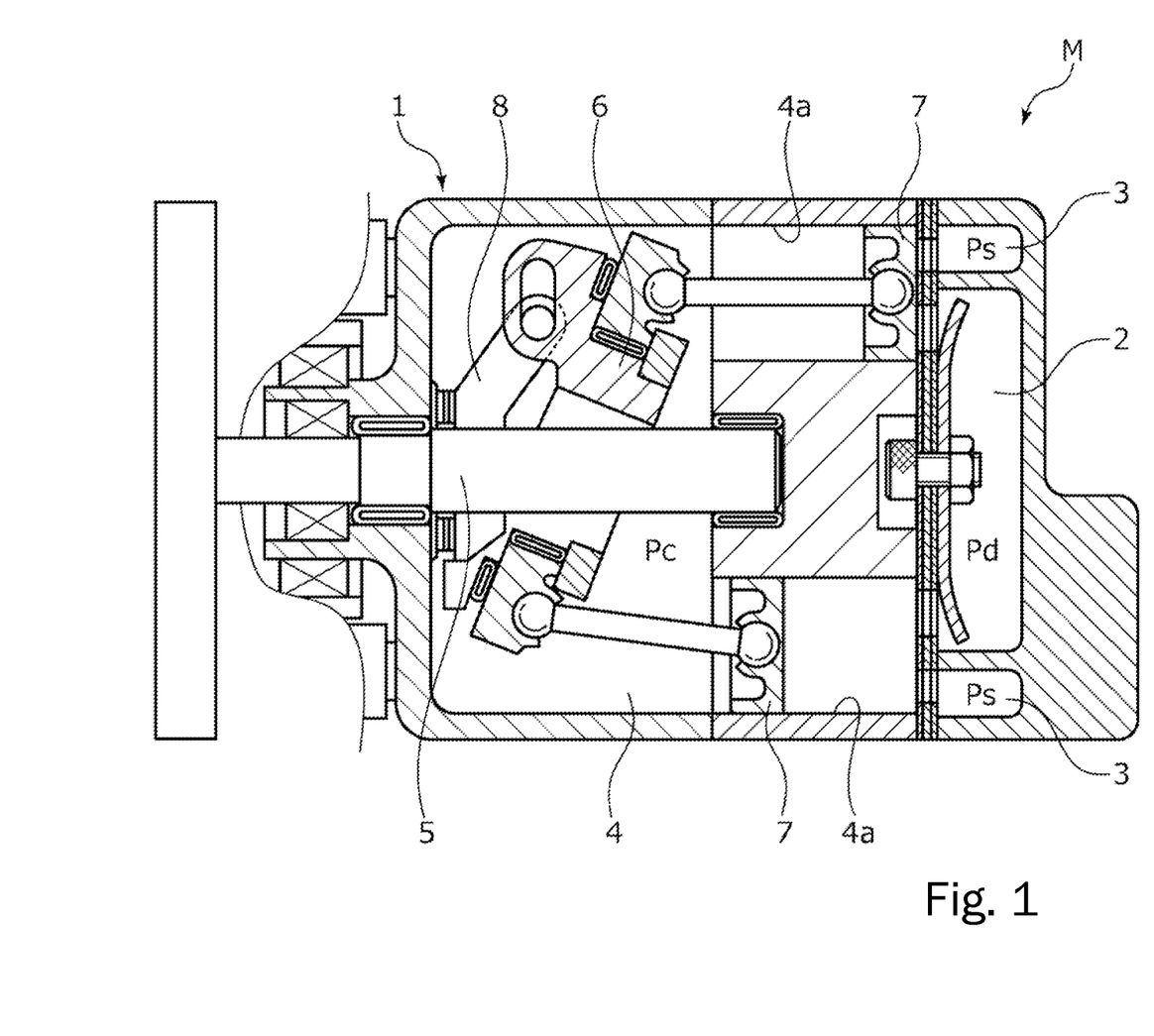
FIG. 1 is a schematic configuration diagram showing a swash plate type variable displacement compressor into which a capacity control valve according to a first embodiment of the present invention is assembled.

First, the variable displacement compressor M will be described. As shown in FIG. 1, the variable displacement compressor M has a casing 1 including a discharge chamber 2, a suction chamber 3, a control chamber 4, and plural cylinders 4a. A communication passage (not shown) providing direct communication between the control chamber 4 and the suction chamber 3 is provided in the variable displacement compressor M. A fixed orifice for adjusting to balance pressure between the suction chamber 3 and the control chamber 4 is provided in this communication passage.

The variable displacement compressor M also includes a rotating shaft 5 to be driven and rotated by an engine (not shown) installed outside the casing 1, a swash plate 6 coupled to the rotating shaft 5 in an eccentric state by a hinge mechanism 8 in the control chamber 4, and plural pistons 7 coupled to the swash plate 6 and fitted reciprocatably in the respective cylinders 4a. With using the capacity control valve V to be driven to open and close by electromagnetic force, a tilt angle of the swash plate 6 is continuously changed by appropriately controlling pressure in the control chamber 4 while utilizing suction pressure Ps of the suction chamber 3 that suctions the fluid, discharge pressure Pd of the discharge chamber 2 that discharges the fluid pressurized by the pistons 7, and control pressure Pc of the control chamber 4 that houses the swash plate 6. Thereby, a stroke amount of the pistons 7 is changed to control a discharge amount of the fluid. For convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 becomes, and the more the stroke amount of the pistons 7 is reduced. However, when the pressure becomes fixed pressure or more, the swash plate 6 is brought into a substantially perpendicular state with respect to the rotating shaft 5, that is, a state where the swash plate is slightly tilted from the exactly perpendicular state. At this time, the stroke amount of the pistons 7 becomes minimum, and pressurization of the fluid in the cylinders 4a by the pistons 7 becomes minimum. Therefore, the discharge amount of the fluid to the discharge chamber 2 is reduced, and the cooling ability of the air conditioning system becomes minimum. Meanwhile, the lower the control pressure Pc in the control chamber 4 is, the larger the tilt angle of the swash plate 6 with respect to the rotating shaft 5 becomes, and the more the stroke amount of the pistons 7 is increased. However, when the pressure becomes fixed pressure or less, the tilt angle of the swash plate 6 with respect to the rotating shaft 5 becomes maximum. At this time, the stroke amount of the pistons 7 becomes maximum, and the pressurization of the fluid in the cylinders 4a by the pistons 7 becomes maximum. Therefore, the discharge amount of the fluid to the discharge chamber 2 is increased, and the cooling ability of the air conditioning system becomes maximum.

Figure 2:
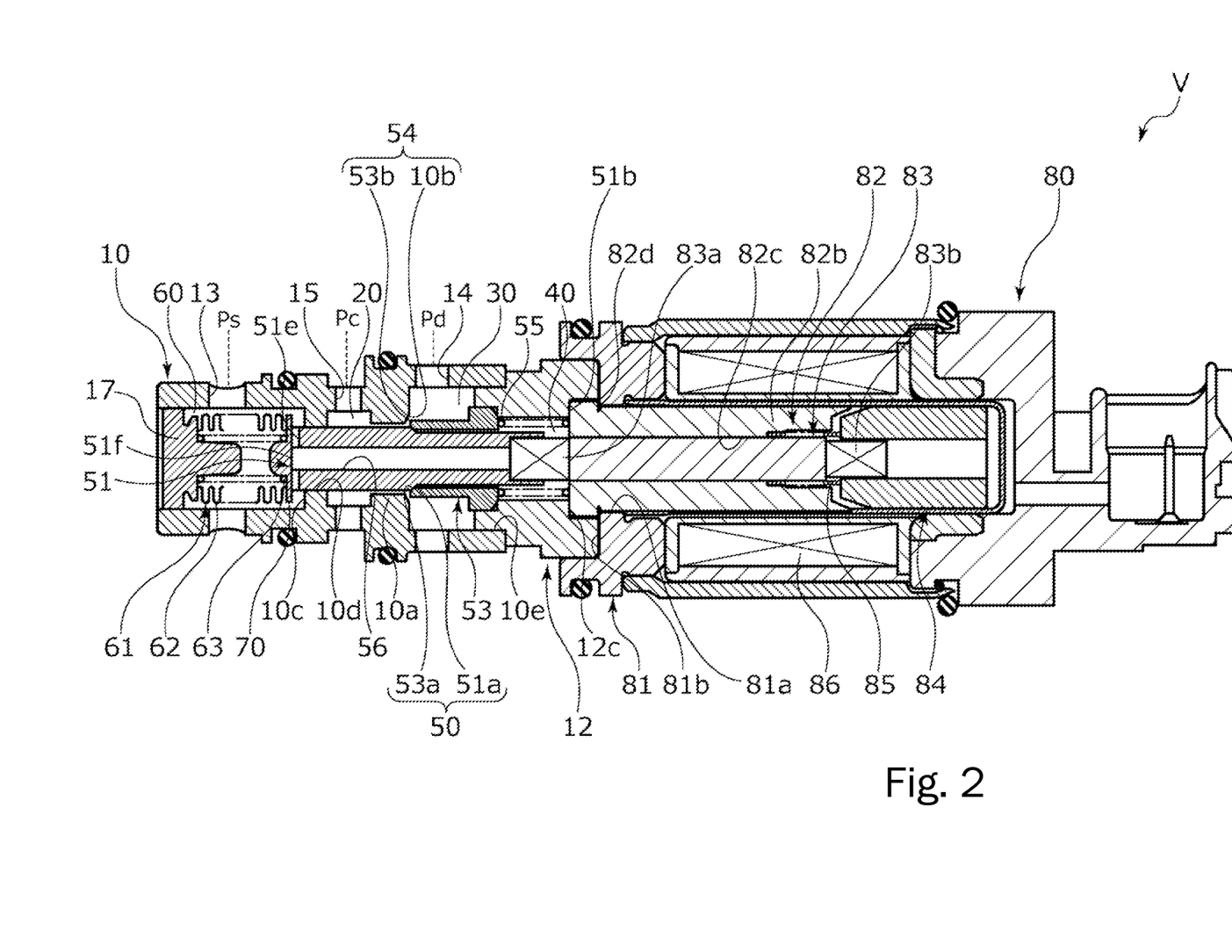
FIG. 2 is a sectional view showing a state where a DC valve is opened and a CS valve is closed in a non-energized state of the capacity control valve in the first embodiment.

As shown in FIG. 2, the capacity control valve V assembled into the variable displacement compressor M is a complex control valve that adjusts an electric current energized in a coil 86 forming a solenoid 80 and performs open/close control of a CS valve 50 serving as a valve that opens and closes communication between a control port and a suction port in the capacity control valve V and a DC valve 54 serving as a valve that opens and closes communication between a discharge port and the control port, and also operates a pressure sensitive body 61 serving as a pressure drive portion by the suction pressure Ps in a pressure sensitive chamber 60 serving as a suction fluid supply chamber, so that by controlling the fluid flowing into the control chamber 4 or flowing out from the control chamber 4, the control pressure Pc in the control chamber 4 is variably controlled.

In the present embodiment, the CS valve 50 is formed by a CS valve element 51 and a CS valve seat 53a formed in an inner diameter portion of an axially left end which is the other end of a DC valve element 53. By bringing and separating a step portion 51a formed in the substantially axial center of the CS valve element 51 into contact with and from the CS valve seat 53a, the CS valve 50 is opened and closed. The DC valve 54 is formed by the other end of the DC valve element 53 and a DC valve seat 10b formed in an inner diameter portion of an axially right end of a central projected portion 10a which projects in the radially inward direction between a Pc port 15 and a Pd port 14 to be described later in the substantially axial center of a first valve housing 10 serving as a valve housing. By bringing and separating an outer diameter portion 53b of the axially left end which is the other end of the DC valve element 53 into contact with and from the DC valve seat 10b, the DC valve 54 is opened and closed.

Next, a structure of the capacity control valve V will be described. As shown in FIG. 2, the capacity control valve V is mainly formed by the first valve housing 10 and a second valve housing 12 serving as a valve housing which is made of a metal material or a resin material, the CS valve element 51 arranged reciprocatably in the axial direction in the first valve housing 10 and the second valve housing 12, the DC valve element 53, the pressure sensitive body 61 that applies axial bias force to the CS valve element 51 and the DC valve element 53 in accordance with the suction pressure Ps, and the solenoid 80 connected to the second valve housing 12, the solenoid that applies drive force to the CS valve element 51 and the DC valve element 53.

In the first valve housing 10, a Ps port 13 serving as the suction port which communicates with the suction chamber 3 of the variable displacement compressor M, the Pc port 15 serving as the control port which communicates with the control chamber 4 of the variable displacement compressor M, and the Pd port 14 serving as the discharge port which communicates with the discharge chamber 2 of the variable displacement compressor M are formed in order from the axially left side.

As shown in FIG. 2, the solenoid 80 is mainly formed by a casing 81 having an opening portion 81a which is open on the axially left side, a substantially cylindrical fixed iron core 82 inserted into the opening portion 81a of the casing 81 from the axially left side and fixed on the radially inner side of the casing 81, a drive rod 83 serving as a rod which is inserted into the fixed iron core 82 reciprocatably in the axial direction, the drive rod whose axially left end portion 83a is inserted and fixed to the CS valve element 51, a movable iron core 84 to which an axially right end portion 83b of the drive rod 83 is inserted and fixed, a coil spring 85 provided between the fixed iron core 82 and the movable iron core 84, the coil spring that biases the movable iron core 84 to the axially right side which is the valve closing direction of the CS valve 50, and the excitation coil 86 wound on the outside of the fixed iron core 82 via a bobbin.

A recessed portion 81b in which the radially inner side of an axially left end is recessed to the axially right side is formed in the casing 81. An axially right end portion of the second valve housing 12 is inserted and fixed to this recessed portion 81b in a substantially sealed manner.

The fixed iron core 82 is made of a rigid body which is a magnetic material such as iron or silicon steel, and includes a cylindrical portion 82b extending in the axial direction, the cylindrical portion where an insertion hole 82c into which the drive rod 83 is inserted is formed, and an annular flange portion 82d extending in the radially outward direction from an outer peripheral surface of an axially left end portion of the cylindrical portion 82b.

The fixed iron core 82 is inserted and fixed to a recessed portion 12c in which the radially inner side of an axially right end of the second valve housing 12 inserted and fixed to the recessed portion 81b of the casing 81 is recessed to the axially left side in a substantially sealed manner in a state where an axially right end surface of the flange portion 82d is abutted with a bottom surface of the recessed portion 81b of the casing 81.

The drive rod 83 is formed in a columnar shape, and the axially left end portion 83a inserted and fixed to the CS valve element 51 and the axially right end portion 83b inserted and fixed to the movable iron core 84 are formed in a plate shape.

As shown in FIG. 2, the first valve housing 10 is formed in a substantially cylindrical bottomed shape by press-fitting a partition adjusting member 17 to an axially left end portion in a substantially sealed manner. The partition adjusting member 17 can adjust the bias force of the pressure sensitive body 61 by adjusting an installment position of the first valve housing 10 in the axial direction.

Inside the first valve housing 10, an annular step portion 10c projecting in the radially inward direction is formed between the Ps port 13 and the Pc port 15. By slidably inserting an axially left end portion of the CS valve element 51 into an axial hole 10d of the step portion 10c, the pressure sensitive chamber 60 communicating with the Ps port 13, the pressure sensitive chamber in which the pressure sensitive body 61 is arranged is formed on the axially left side of the step portion 10c.

By recessing an axially right end to the axially left side, a recessed portion 10e is formed, and by inserting an axially left end portion of the second valve housing 12 from the axially right side, the first valve housing 10 is integrally connected and fixed in a substantially sealed manner.

Inside the first valve housing 10, a first valve chamber 20 communicating with the Pc port 15, the first valve chamber in which a large diameter portion 51c of the CS valve element 51 on the axially left side (see FIGS. 4 to 6) is arranged is formed, and a second valve chamber 30 communicating with the Pd port 14, the second valve chamber in which the DC valve element 53 is arranged is formed. Inside the second valve housing 12, a third valve chamber 40 communicating with the Ps port 13 via a supply passage 56 and a cutout 51e (see FIGS. 4 to 6) serving as communication portions to be described later, the third valve chamber in which a small diameter portion 51d of the CS valve element 51 on the axially right side (see FIGS. 4 to 6) and an axially right end portion of the DC valve element 53 are arranged is formed.

Inside the first valve housing 10 and the second valve housing 12, the CS valve element 51 and the DC valve element 53 are reciprocatably arranged in the axial direction. On an inner peripheral surface of the first valve housing 10, an axial hole 10f into which the large diameter portion 51c of the CS valve element 51 is inserted is formed in the substantially axial center. Further, in an inner diameter portion of the substantially axial center of the first valve housing 10, the DC valve seat 10b with which the outer diameter portion 53b of the axially left end of the DC valve element 53 is capable of being abutted is formed in the inner diameter portion of the axially right end of the central projected portion 10a.

Figure 3:
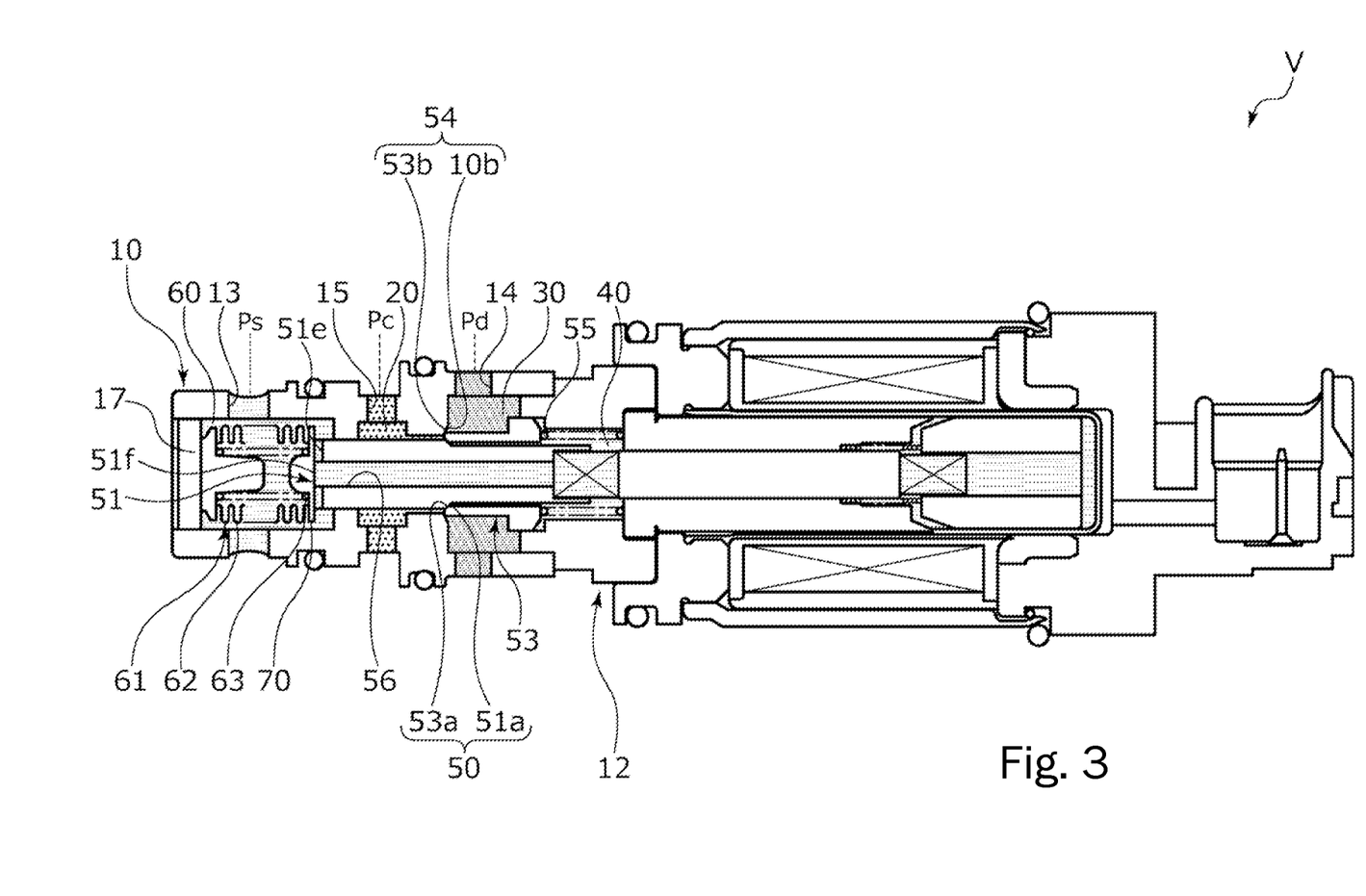
FIG. 3 is a sectional view showing pressure distribution when the DC valve and the CS valve are closed in an energized state of the capacity control valve (e.g., at the time of normal control) in the first embodiment. In order to show the pressure distribution, sections of members are not shown in the figure.
Figure 4:
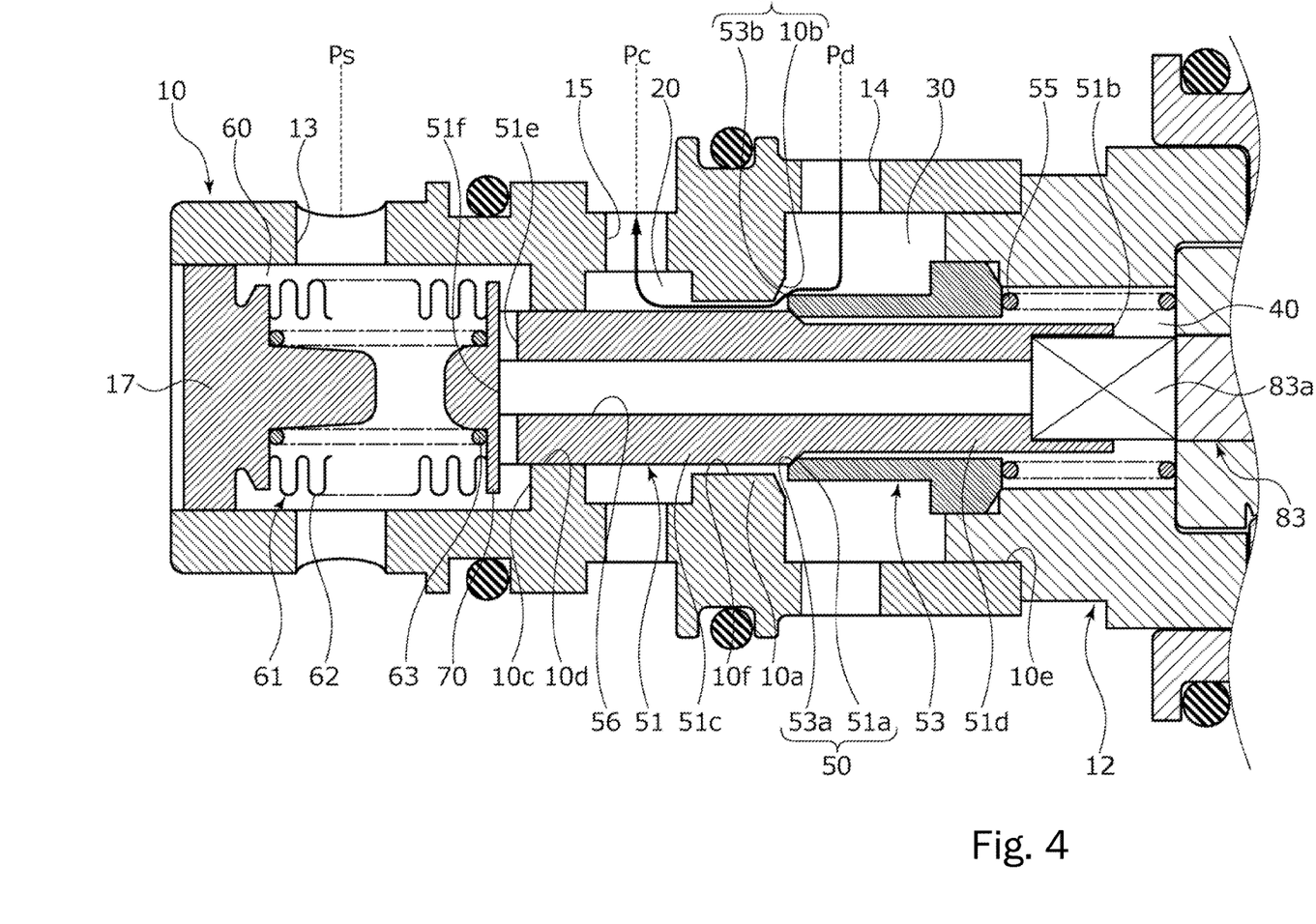
FIG. 4 is an enlarged sectional view of FIG. 2 showing a state where the DC valve is opened and the CS valve is closed in a non-energized state of the capacity control valve.
Figure 5:
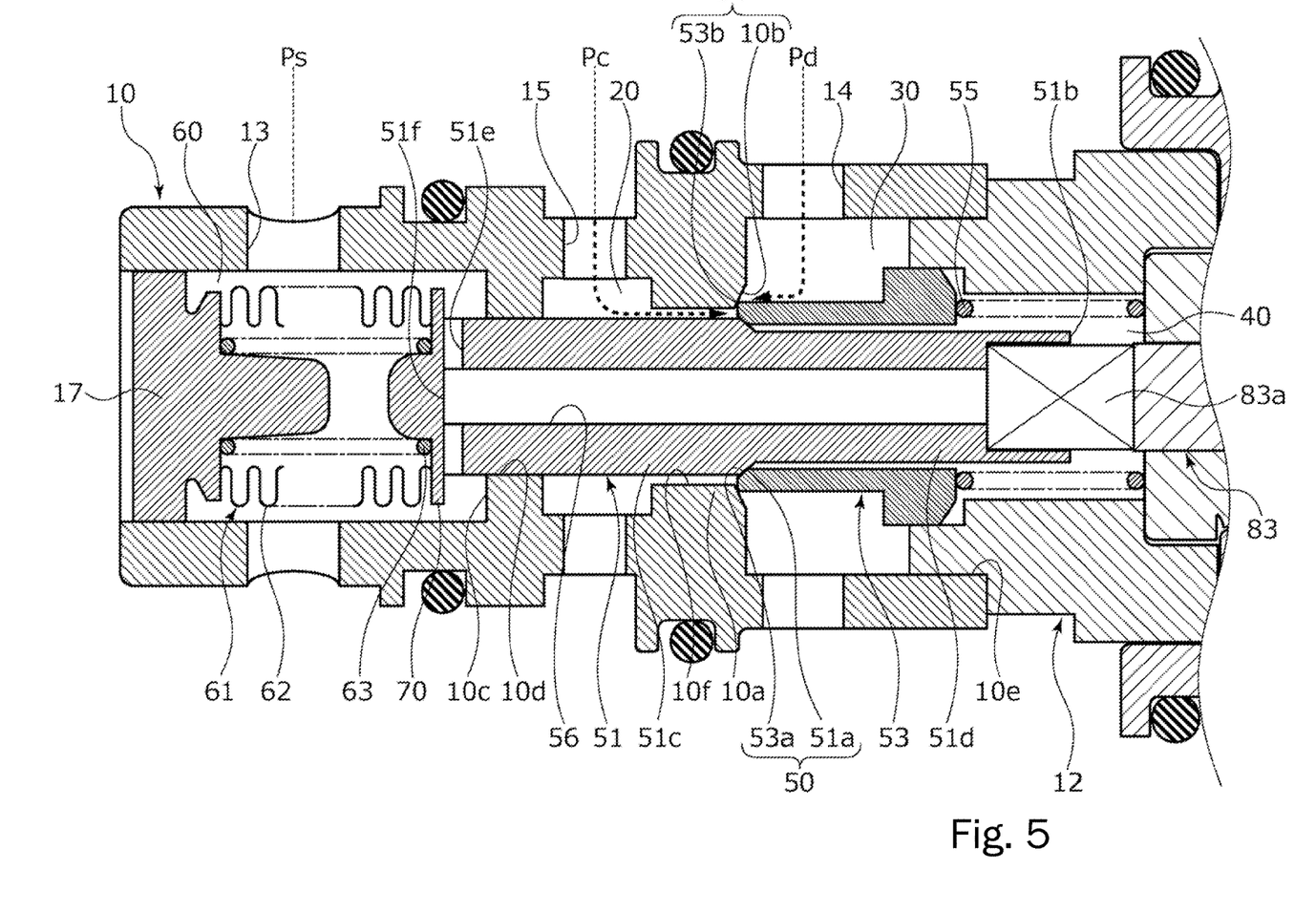
FIG. 5 is an enlarged sectional view showing a state where the DC valve and the CS valve are closed in an energized state of the capacity control valve (e.g., at the time of normal control) in the first embodiment.
Figure 6:
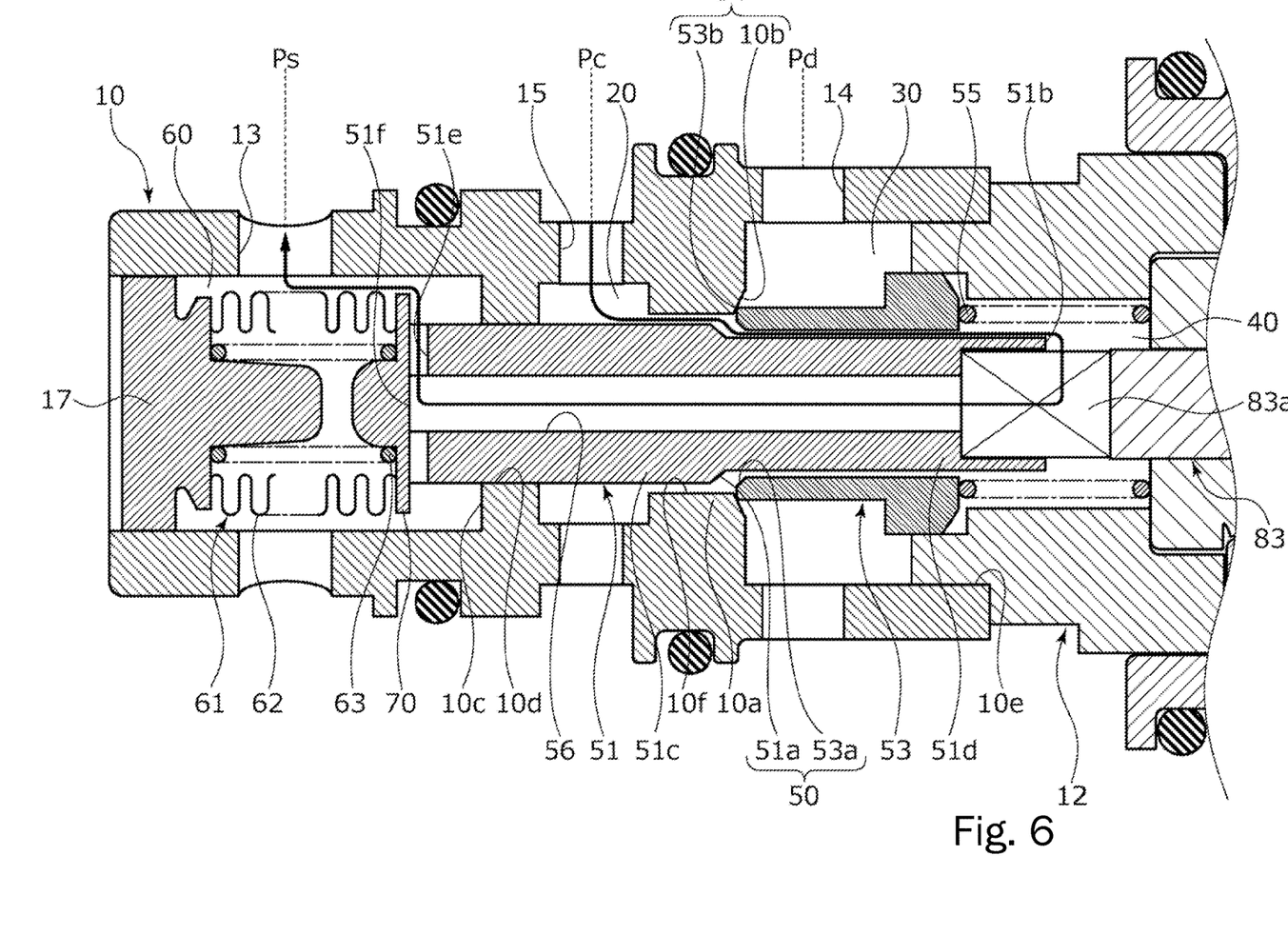
FIG. 6 is an enlarged sectional view showing a state where the DC valve is closed and the CS valve is opened in an energized state of the capacity control valve (e.g., the maximum energized state) in the first embodiment.

The first valve chamber 20 is capable of communicating with the second valve chamber 30 or the third valve chamber 40 via a radial gap formed between an inner peripheral surface of the axial hole 10f and an outer peripheral surface of the large diameter portion 51c of the CS valve element 51 in the substantially axial center of the first valve housing 10. In detail, as shown in FIGS. 2 and 4, when the CS valve 50 is closed and the DC valve 54 is opened, the second valve chamber 30 and the first valve chamber 20 communicate with each other, and the first valve chamber 20 and the third valve chamber 40 are isolated from each other. As shown in FIGS. 3 and 5, when the CS valve 50 and the DC valve 54 are closed, the second valve chamber 30 and the first valve chamber 20 are isolated from each other, and the first valve chamber 20 and the third valve chamber 40 are isolated from each other. As shown in FIG. 6, when the CS valve 50 is opened and the DC valve 54 is closed, the second valve chamber 30 and the first valve chamber 20 are isolated from each other, and the first valve chamber 20 and the third valve chamber 40 communicate with each other.

As shown in FIGS. 4 to 6, the CS valve element 51 is formed in a stepped substantially-cylindrical shape by the large diameter portion 51c inserted into the axial hole 10f of the first valve housing 10, and the small diameter portion 51d formed on the axially right side of the large diameter portion 51c to have a smaller diameter than the large diameter portion 51c, the small diameter portion onto which the cylindrical DC valve element 53 is fitted in a non-sealed manner. The axially left end portion 83a of the drive rod 83 forming the solenoid 80 is inserted and fixed to an axially right end portion of the CS valve element 51, that is, an axially right end portion of the small diameter portion 51d, and both are movable in the axial direction. Inside the CS valve element 51, the supply passage 56 extending in the axial direction from an axially right end to an axially left end portion is formed. Regarding the axially left end portion of the supply passage 56, the axially left end portion is formed in a cylindrical shape and separably coupled to a disc-shaped adapter 70 to be described later in a substantially sealed manner. The supply passage 56 communicates with the pressure sensitive chamber 60 via the cutout 51e passing through in the radial direction in the axially left end portion.

By inserting and fixing the plate-shaped axially left end portion 83a of the drive rod 83 to the axially right end portion of the small diameter portion 51d of the CS valve element 51, and separating an axially right end 51b and an axially left end of the fixed iron core 82 from each other in the axially left-right direction at a predetermined interval, a plate surface of the axially left end portion 83a of the drive rod 83 and the inner peripheral surface of the small diameter portion 51d of the CS valve element 51 communicate with each other, and the fluid can always run round from the third valve chamber 40 to the supply passage 56.

The step portion 51a formed in the substantially axial center of the CS valve element 51, that is, in an axially right end of the large diameter portion 51c is formed in a tapered shape toward the axially right side where the small diameter portion 51d is formed, and brought into contact with and separated from the CS valve seat 53a formed in the inner diameter portion of the axially left end of the DC valve element 53.

By forming the CS valve element 51 in a constricted shape where an outer peripheral surface is recessed to the radially inner side from the large diameter portion 51c to the small diameter portion 51d, it is possible to ensure a large flow passage area of a Pc-Ps flow passage (shown by a solid arrow in FIG. 6) from the Pc port 15 to the Ps port 13 at the time of opening the CS valve 50.

As shown in FIGS. 4 to 6, a coil spring 55 serving as bias means is fitted onto the axially right end portion of the small diameter portion 51d of the CS valve element 51, an axially right end of the coil spring 55 is abutted with the axially left side surface of the fixed iron core 82, and an axially left end of the coil spring 55 is abutted with an axially right end which is one end of the DC valve element 53. The coil spring 55 applies bias force to the axially left side which is the valve closing direction of the DC valve 54 in such a manner that the outer diameter portion 53b of the axially left end which is the other end of the DC valve element 53 is abutted with the DC valve seat 10b formed in the inner diameter portion of the axially right end of the central projected portion 10a of the first valve housing 10. A spring constant of the coil spring 55 is set to be smaller than a coil spring 63 provided in the pressure sensitive body 61.

As shown in FIGS. 2 to 6, the pressure sensitive body 61 is mainly formed by a bellows core 62 in which the coil spring 63 is built, and the disc-shaped adapter 70 provided in an axially right end of the bellows core 62, and an axially left end of the bellows core 62 is fixed to the partition adjusting member 17.

The pressure sensitive body 61 is arranged in the pressure sensitive chamber 60, and an axially right end of the adapter 70 is coupled and fixed to an axially left end 51f of the CS valve element 51. That is, it is possible to apply the drive force of the solenoid 80 to the axially left side to the pressure sensitive body 61 via the CS valve element 51 and to receive bias in the axial direction in accordance with the suction pressure Ps from the pressure sensitive body 61.

Pressure distribution of the capacity control valve V will be described with using FIG. 3. FIG. 3 shows a state where the CS valve 50 and the DC valve 54 are closed in an energized state of the capacity control valve V (e.g., at the time of normal control). As shown in FIG. 3, the control pressure Pc introduced from the Pc port 15 is distributed from the first valve chamber 20 to the axially left side of the closed CS valve 50 and the radially inner side of the closed DC valve 54 via a radial gap formed between the inner peripheral surface of the axial hole 10*f* and the outer peripheral surface of the large diameter portion 51*c* of the CS valve element 51 in the substantially axial center of the first valve housing 10. The discharge pressure Pd introduced from the Pd port 14 is distributed from the second valve chamber 30 to the radially outer side of the closed DC valve 54. The suction pressure Ps introduced from the Ps port 13 is distributed in the pressure sensitive chamber 60 and distributed to the radially inner side of the closed CS valve 50 via the cutout 51*e* and the supply passage 56.

Next, actions of the capacity control valve V, mainly actions of opening and closing the CS valve 50 and the DC valve 54 will be described.

First, a non-energized state of the capacity control valve V will be described. As shown in FIGS. 2 and 4, in the capacity control valve V, in a non-energized state, by pressing the movable iron core 84 to the axially right side by bias force of the coil spring 85 forming the solenoid 80 and bias force of the coil spring 63 and the bellows core 62, the drive rod 83 and the CS valve element 51 are moved to the axially right side, the step portion 51*a* of the CS valve element 51 is seated on the CS valve seat 53*a* formed in the inner diameter portion of the axially left end of the DC valve element 53, and the CS valve 50 is closed. The bias force of the coil spring 55 is applied to the DC valve element 53 to the axially left side, and the bias force is supported by the CS valve element 51.

At this time, to the CS valve element 51, the bias force $F_{sp1}$ of the coil spring 85 is applied to the axially right side via the drive rod 83, the bias force $F_{be1}$ of the pressure sensitive body 61, that is, the bias force of the bellows core 62 and the coil spring 63 is applied from the axially left end 51*f*, and the bias force $F_{sp2}$ of the coil spring 55 is applied to the axially left side via the DC valve element 53. That is, given that the right side is the positive side, force $F_{rod}-F_{sp2}$ is applied to the CS valve element 51. The force $F_{rod}$ is equal to $F_{sp1}+F_{be1}$. The bias force $F_{sp2}$ of the coil spring 55 is smaller than the force $F_{rod}$ (i.e., $F_{sp2}<F_{rod}$). Further, since an influence of pressure is small, the pressure is omitted.

In a non-energized state, by pressing the DC valve element 53 to the axially right side by the CS valve element 51, the outer diameter portion 53*b* of the axially left end of the DC valve element 53 is separated from the DC valve seat 10*b*, and the DC valve 54 is opened.

Next, an energized state of the capacity control valve V will be described. As shown in FIG. 5, in the capacity control valve V, in an energized state, that is, at the time of normal control, at the time of so-called duty control, when electromagnetic force $F_{sol}1$ generated by applying an electric current to the solenoid 80 exceeds the force $F_{rod}-F_{sp2}$ (i.e., $F_{sol}1>F_{rod}-F_{sp2}$), by pulling the movable iron core 84 to the fixed iron core 82 side, that is, to the axially left side, moving the drive rod 83 fixed to the movable iron core 84, the CS valve element 51, and the DC valve element 53 together to the axially left side, and pressing and contracting the pressure sensitive body 61 to the axially left side, the outer diameter portion 53*b* of the DC valve element 53 is seated on the DC valve seat 10*b*, and the DC valve 54 is closed.

During a period from start of energization to closing of the DC valve 54, to the CS valve element 51, the electromagnetic force $F_{sol}1$ is applied and the bias force $F_{sp2}$ of the coil spring 55 is applied via the DC valve element 53 to the axially left side, and the force $F_{rod}$ is applied to the axially right side. That is, given that the right side is the positive side, force $F_{rod}-F_{sp2}-F_{sol}1$ is applied to the CS valve element 51. When the DC valve 54 is closed, the bias force $F_{sp2}$ of the coil spring 55 applied to the axially left side via the DC valve element 53 is applied to the DC valve seat 10*b* and therefore not applied to the CS valve element 51. That is, given that the right side is the positive side, force $F_{rod}-F_{sol}1$ is applied to the CS valve element 51.

In the normal control of the capacity control valve V, in a case where a flow rate of the fluid from the Pd port 14 to the Pc port 15 is controlled by adjusting an opening degree or an opening time of the DC valve 54, by controlling an electric current value in such a manner that the electromagnetic force $F_{sol}1$ generated by applying an electric current to the solenoid 80 exceeds the force $F_{rod}-F_{sp2}$ (i.e., $F_{sol}1>F_{rod}-F_{sp2}$) and also falls under the force $F_{rod}$ (i.e., $F_{sol}1<F_{rod}$), it is possible to perform open/close control of the DC valve 54 in a state where closing of the CS valve 50 is maintained.

In a case where the variable displacement compressor M is driven at the maximum capacity, as shown in FIG. 6, by bringing the capacity control valve V into the maximum energized state, that is, an energized state of the maximum duty at the time of normal control, so that electromagnetic force $F_{sol}2$ generated by applying the maximum electric current to the solenoid 80 exceeds the force $F_{rod}$ (i.e., $F_{sol}2>F_{rod}$), and by moving the CS valve element 51 alone to the axially left side and leaving the DC valve body 53 while the CS valve element 51 fixed to the drive rod 83 maintains a closed state of the DC valve 54, the step portion 51*a* of the CS valve element 51 is separated from the CS valve seat 53*a* formed in the inner diameter portion of the axially left end of the DC valve element 53, and the CS valve 50 is opened. According to this, the CS valve 50 is opened while maintaining a closed state of the DC valve 54, and the Pc-Ps flow passage (shown by the solid arrow in FIG. 6) providing communication between the Pc port 15 and the Ps port 13 is formed. That is, by providing communication between the control chamber 4 and the suction chamber 3, it is possible to promptly lower the control pressure Pc and maintain the control pressure Pc and the suction pressure Ps at equalized pressure. Thus, it is possible to provide the capacity control valve V with which compression efficiency is high. Even at the time of start-up of the variable displacement compressor M, by bringing the capacity control valve V into the maximum energized state, it is possible to open the CS valve 50 and provide communication between the Pc port 15 and the Ps port 13. Thus, it is possible to provide the capacity control valve V with which a fluid discharge function at the time of start-up is excellent.

Figure 7:
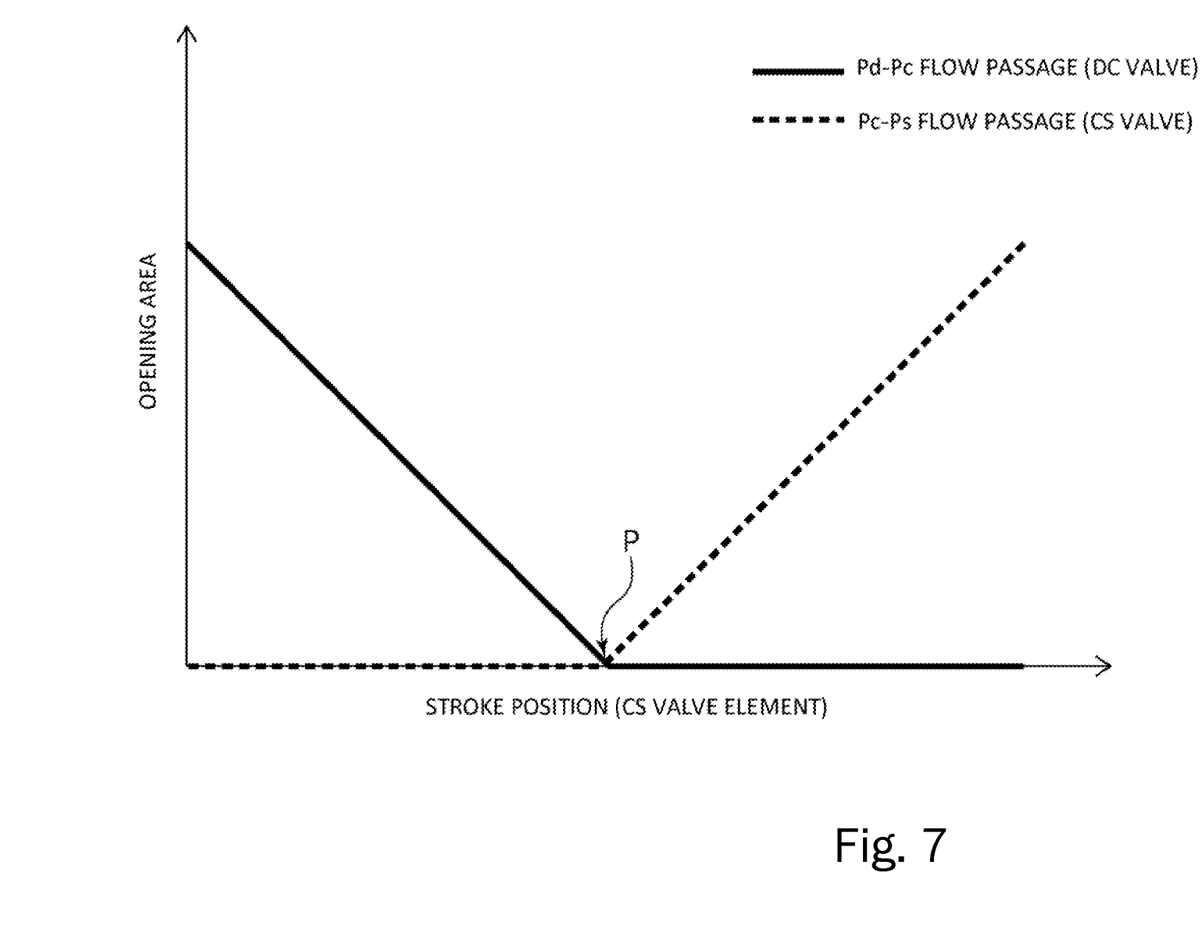
FIG. 7 is a graph for illustrating opened and closed states of the DC valve and opened and closed states of the CS valve with respect to a stroke position of the CS valve element in the capacity control valve in the first embodiment.

Next, with reference to FIG. 7, opened and closed states of the CS valve 50 and opened and closed states of the DC valve 54 with respect to a stroke position of the CS valve element 51 will be described. The horizontal axis of FIG. 7 indicates the stroke position to which the CS valve element 51 is moved following the electric current applied to the solenoid 80. As shown in FIG. 7, when the stroke position of the CS valve element 51 corresponding to the time of non-energization to the solenoid 80 is zero, the CS valve 50 is closed and an opening area of the DC valve 54 is maximum. The opening area of the DC valve 54 in a Pd-Pc flow passage is linearly reduced in accordance with the stroke position of the CS valve element 51 following the electric current applied to the solenoid 80. At this time, the CS valve 50 is maintained in a closed state. When the stroke position of the CS valve element 51 reaches a point P, the DC valve 54 and the CS valve 50 are in a closed state. When the stroke position of the CS valve element 51 exceeds the point P, the DC valve 54 is maintained in a closed state, and an opening area of the CS valve 50 in the Pc-Ps flow passage is linearly increased in accordance with the stroke position of the CS valve element 51. In such a way, it is possible to switch opening and closing of the DC valve 54 and the CS valve 50 by the stroke position of the CS valve element 51 with respect to the point P. Thus, a control property is enhanced.

In addition, as shown in FIGS. 4 to 6, at the time of start-up, normal control, etc. of the capacity control valve V, in a case where the suction pressure Ps applied to the pressure sensitive body 61 is high and force based on the suction pressure Ps exceeds the bias force of the bellows core 62 and the coil spring 63 forming the pressure sensitive body 61, by contracting the pressure sensitive body 61, the CS valve element 51 whose axially left end 51$f$ is coupled and fixed to the adapter 70 is pulled to the axially left side, and against the bias force of the coil spring 85 forming the solenoid 80, by moving the CS valve element 51, the drive rod 83, and the movable iron core 84 together to the axially left side, the outer diameter portion 53$b$ of the DC valve element 53 is seated on the DC valve seat 10$b$ while maintaining a closed state of the CS valve 50, and the DC valve 54 is closed (see FIG. 5). In a case where the suction pressure Ps is sufficiently high, by further contracting the pressure sensitive body 61 from a state where the DC valve 54 is closed, the CS valve element 51 is pulled to the axially left side, and against the bias force of the coil spring 85, by moving the CS valve element 51, the drive rod 83, and the movable iron core 84 together to the axially left side, the step portion 51$a$ of the CS valve element 51 is separated from the CS valve seat 53$a$ while maintaining a closed state of the DC valve 54, and the CS valve 50 is opened (see FIG. 6). According to this, it is possible to contract the pressure sensitive body 61 by high suction pressure Ps and to supplement the drive force of the solenoid 80. Thus, it is possible to provide the capacity control valve V having a stable fluid discharge function and a stable compression performance at the time of start-up. In a case where the capacity control valve V is brought into the maximum energized state, it is possible to increase the opening area of the CS valve 50 in the Pc-Ps flow passage opened by the electromagnetic force $F_{sol}2$ which is generated by applying the maximum electric current to the solenoid 80.

As described above, the CS valve element 51 and the DC valve element 53 are moved together by movement of the drive rod 83 while maintaining a closed state of the CS valve 50, and when the drive rod 83 is further moved, the CS valve element 51 is moved alone and the DC valve element 53 is left while maintaining a closed state of the DC valve 54. In such a way, by arranging the DC valve element 53 movably with respect to the CS valve element 51, it is possible to perform open/close control of the DC valve 54 in a state where the CS valve 50 is closed at the time of normal control. Moreover, by opening the CS valve 50 and providing communication between the Pc port 15 and the Ps port 13 by the movement of the drive rod 83 while maintaining a closed state of the DC valve 54 in the maximum energized state, it is possible to lower the control pressure Pc. Thus, it is possible to provide the capacity control valve V with which the fluid discharge function at the time of start-up is excellent and the compression efficiency is high. In addition, at the time of start-up, normal control, etc., when the suction pressure Ps in the pressure sensitive chamber 60 is high, it is possible to operate the pressure sensitive body 61 to supplement the drive force of the solenoid 80. Thus, it is possible to provide the capacity control valve V having a stable fluid discharge function and a stable compression performance at the time of start-up.

The DC valve element 53 is fitted onto the CS valve element 51 and the CS valve seat 53$a$ is formed in the inner diameter portion of the DC valve element 53. Thus, by inserting the CS valve element 51 into the DC valve element 53, it is possible to form the compact capacity control valve V having the DC valve 54, and to move the DC valve element 53 and the CS valve element 51 together while reliably maintaining a closed state of the CS valve 50 in a non-energized state and at the time of normal control.

The CS valve seat 53$a$ is formed in the inner diameter portion on the axially left side which is the other end of the DC valve element 53, and the DC valve seat 10$b$ is formed on the radially outer side thereof. Thus, the flow passage is smoothly switched by opening and closing the CS valve 50 and the DC valve 54. Therefore, responsiveness is good.

The DC valve element 53 is biased to the axially left side which is the valve closing direction of the DC valve 54 by the coil spring 55. Thus, in a non-energized state and at the time of normal control, the DC valve element 53 can reliably maintain a closed state with respect to the CS valve element 51, and in the maximum energized state, the DC valve element 53 can reliably maintain a closed state with respect to the DC valve seat 10$b$. In addition, in a non-energized state and at the time of normal control, the DC valve element 53 is biased in the direction in which the drive rod 83 is moved by the coil spring 55. Thus, it is possible to reduce the electric current applied to the solenoid 80.

The cutout 51$e$ and the supply passage 56 communicating with the pressure sensitive chamber 60 are formed in the CS valve element 51. Thus, it is possible to simplify a structure of the first valve housing 10 and the second valve housing 12.

Second Embodiment

Next, a capacity control valve according to a second embodiment of the present invention will be described with reference to FIG. 8. Duplicated description for the same configurations as the above embodiment is omitted.

Figure 8:
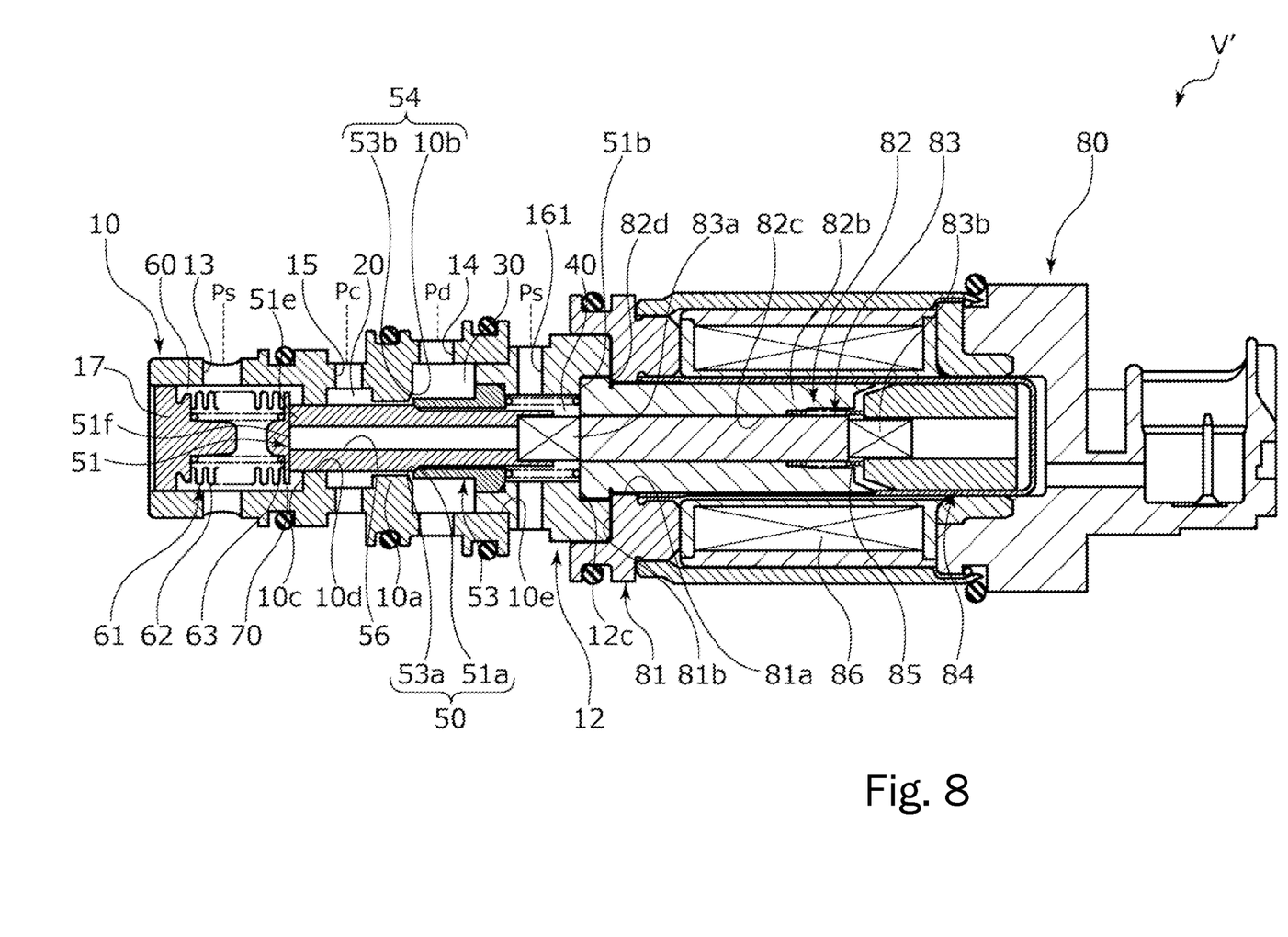
FIG. 8 is a sectional view showing a state where a DC valve is opened and a CS valve is closed in a non-energized state of a capacity control valve according to a second embodiment of the present invention.

As shown in FIG. 8, a capacity control valve V' includes a first valve housing 10 and a second valve housing 12 serving as a valve housing made of a metal material or a resin material. In the second valve housing 12, a second Ps port 161 serving as a second suction port which communicates with a suction chamber 3 of a variable displacement compressor M is formed independently from a Ps port 13. The second Ps port 161 communicates with a third valve chamber 40 formed inside the second valve housing 12. Regarding an axially left end portion of a supply passage 56 formed inside a CS valve element 51, the axially left end portion is formed in a cylindrical shape and separably coupled to an adapter 70 in a substantially sealed manner. In other words, the cutout 51$e$ shown in the first embodiment is not formed, and the third valve chamber 40 is closed with respect to a pressure sensitive chamber 60 inside the first valve housing 10 and the second valve housing 12.

According to the above description, the second suction port is formed in the second valve housing 12 at a position where the pressure sensitive body 61 is not arranged. Thus, it is possible to simplify a structure of the CS valve element 51.

The embodiments of the present invention are described above with the drawings. However, specific configurations are not limited to these embodiments but the present invention includes changes and additions within the range not departing from the scope of the present invention.

For example, by changing the spring constant of the coil spring 55, a control characteristic of the CS valve element 51 may be changed.

The coil spring 55 may be an extension spring. In this case, the extension spring may be arranged on the axially left side of the DC valve element 53 in an extended state.

A timing of opening and closing the CS valve 50 and the DC valve 54 by the stroke position of the CS valve element 51 based on the drive force of the solenoid 80 may be appropriately adjusted by changing axial arrangement of the DC valve element 53 with respect to the CS valve element 51, an axial position where the DC valve seat 10b is formed in the first valve housing 10, or size, a shape, etc. of the DC valve element 53.

In the above embodiments, the example in which the CS valve 50 is formed by bringing and separating the CS valve element 51 into contact with and from the CS valve seat 53a while maintaining a closed state of the DC valve 54 is described. However, other configurations may be used, and for example, the CS valve may have a spool valve structure.

The first valve housing 10 and the second valve housing 12 forming the valve housing may be partly integrated or totally integrated.

The coil spring may not be used inside the pressure sensitive body 61 but the bellows core 62 may have bias force.

REFERENCE SIGNS LIST

1 Casing
2 Discharge chamber
3 Suction chamber
4 Control chamber
10 First valve housing (valve housing)
10b DC valve seat
12 Second valve housing (valve housing)
13 Ps port (suction port)
14 Pd port (discharge port)
15 Pc port (control port)
20 First valve chamber
30 Second valve chamber
40 Third valve chamber
50 CS valve
51 CS valve element
51a Step portion
51e Cutout (communication portion)
53 DC valve element
53a CS valve seat
53b Outer diameter portion
54 DC valve
55 Coil spring (bias means)
56 Supply passage (communication portion)
60 Pressure sensitive chamber (suction fluid supply chamber)
61 Pressure sensitive body (pressure drive portion)
62 Bellows core
63 Coil spring
70 Adapter
80 Solenoid
83 Drive rod (rod)
84 Movable iron core
85 Coil spring
161 Second Ps port (second suction port)
Pc Control pressure
Pd Discharge pressure
Ps Suction pressure
V, V' Capacity control valve

The invention claimed is:

1. A capacity control valve comprising:
a valve housing provided with a discharge port through which a discharge fluid of discharge pressure passes, a suction port through which a suction fluid of suction pressure passes, and a control port through which a control fluid of control pressure passes;
a rod configured to be driven by a solenoid;
a CS valve formed by a CS valve seat and a CS valve element and configured to open and close a communication between the control port and the suction port;
a DC valve formed by a DC valve seat and a DC valve element and arranged movably with respect to the CS valve element, the DC valve being configured to open and close a communication between the discharge port and the control port in accordance with a movement of the rod; and
a pressure drive portion coupled to the CS valve element to be movable in an integrated manner with the CS valve element and arranged in a suction fluid supply chamber which is formed in the valve housing and to which the suction fluid is supplied, the pressure drive portion being driven by the suction pressure, wherein
the CS valve element and DC valve element are moved together by the movement of the rod while maintaining a closed state of the CS valve, and when the rod is further moved, the CS valve element is moved alone and the DC valve element is left while maintaining a closed state of the DC valve, wherein
the DC valve element is externally fitted to the CS valve element, and the CS valve seat is formed in an inner diameter portion of the DC valve element, and wherein
the CS valve seat is formed in one end of the DC valve element, and the DC valve seat is formed on a radially outer side of the CS valve seat.

2. The capacity control valve according to claim 1, wherein
the DC valve element is biased in a valve closing direction of the DC valve by a biasing device.

3. The capacity control valve according to claim 2, wherein
a communication portion communicating with the suction fluid supply chamber is formed in the CS valve element.

4. The capacity control valve according to claim 2, wherein
a second suction port is formed in the valve housing at a position where the pressure drive portion is not arranged.

5. The capacity control valve according to claim 1, wherein
a communication portion communicating with the suction fluid supply chamber is formed in the CS valve element.

6. The capacity control valve according to claim 1, wherein
a second suction port is formed in the valve housing at a position where the pressure drive portion is not arranged.

* * * * *